US005310517A

United States Patent [19]

Dams et al.

[11] Patent Number: 5,310,517

[45] Date of Patent: May 10, 1994

[54] METHOD FOR MANUFACTURE OF A GLOVE, IN PARTICULAR FOR A GLOVE BOX CONTAINING RADIOACTIVE MATERIALS

[75] Inventors: Wolfgang Dams, Zwingenberg; Werner Wegner, Hofheim-Marxheim, both of Fed. Rep. of Germany

[73] Assignee: Siemens Aktiengesellschaft, Munich, Fed. Rep. of Germany

[21] Appl. No.: 967,404

[22] Filed: Oct. 26, 1992

Related U.S. Application Data

[60] Division of Ser. No. 846,732, Mar. 4, 1992, Pat. No. 5,165,114, which is a continuation of Ser. No. 353,827, May 18, 1989, abandoned.

[30] Foreign Application Priority Data

May 18, 1988 [DE] Fed. Rep. of Germany ....... 3816951

[51] Int. Cl.[5] .............................................. B29C 41/14

[52] U.S. Cl. ........................................ 264/255; 2/168; 250/516.1; 264/301; 264/305; 264/DIG. 77; 976/DIG. 339

[58] Field of Search ....... 264/301, 305, 255, DIG. 77; 2/168; 250/516.1; 976/DIG. 339

[56] References Cited

U.S. PATENT DOCUMENTS

| | | | |
|---|---|---|---|
| 1,152,372 | 8/1915 | Miller | 264/305 |
| 2,173,734 | 9/1939 | Sidnell | 264/301 |
| 2,324,735 | 7/1943 | Spanel | 264/301 |
| 3,185,751 | 5/1965 | Sutton | 264/305 |
| 3,382,138 | 5/1968 | Barth | 2/168 |
| 3,411,982 | 11/1968 | Kavalir | 2/168 |
| 4,441,213 | 4/1984 | Trumble et al. | 2/161 R |
| 4,519,098 | 5/1985 | Dunmire et al. | 264/305 |
| 4,917,850 | 4/1990 | Gray | 264/301 |

*Primary Examiner*—Jeffery Thurlow
*Attorney, Agent, or Firm*—Herbert L. Lerner; Laurence A. Greenberg

[57] ABSTRACT

A glove, especially for a glove box containing radioactive materials, and a method for producing the same, includes a polyurethane glove body having two sides, a first layer of thermoplastic monocomponent polyester urethane being based on an aromatic diisocyanate and being free of reinforcing fabric, a second layer of synthetic rubber on at least one of the sides, and a connecting layer between the first and second layers formed of a mixture of the polyester urethane and the synthetic rubber.

9 Claims, 1 Drawing Sheet

METHOD FOR MANUFACTURE OF A GLOVE, IN PARTICULAR FOR A GLOVE BOX CONTAINING RADIOACTIVE MATERIALS

This is a division of application Ser. No. 846,732, filed Mar. 4, 1992 now U.S. Pat. No. 5,165,114 which is a continuation of Ser. No. 07/353,827, filed May 18, 1989 now abandoned.

The invention relates to a glove, especially for a glove box containing radioactive materials, having a glove body of polyurethane formed of thermoplastic monocomponent polyester urethane being based on an aromatic diisocyanate and being free of reinforcing fabric, and a method of producing the same.

Such a glove, which is known from U.S. Pat. No. 3,883,749, is used for surgical purposes and is manufactured with a mold body ending in a hand. The mold body is repeatedly dipped into and removed again from a mixture of monocomponent polyester methane and a solvent formed of dimethylacetamide. Instead of this mixture, synthetic rubber, among other materials, may be used as a starting material for manufacturing the glove. However, the glove is not as thin and elastic as desired nor is it sufficiently protected against chemical decomposition.

It is accordingly an object of the invention to provide a glove, in particular for a glove box containing radioactive materials, and a method for its manufacture, which overcome the hereinafore-mentioned disadvantages of the heretofore-known methods and devices of this general type and which provide a glove that is as thin and elastic as possible but is nevertheless protected against chemical decomposition.

With the foregoing and other objects in view there is provided, in accordance with the invention, a glove, especially for a glove box containing radioactive materials, comprising a polyurethane glove body having two sides, a first layer of thermoplastic monocomponent polyester urethane being based on an aromatic diisocyanate and being free of reinforcing fabric, a second layer of synthetic rubber on at least one of the sides, and a connecting layer between the first and second layers formed of a mixture of the polyester urethane and the synthetic rubber.

The thermoplastic monocomponent polyester urethane used for this glove, which is based on an aromatic diisocyanate, is soluble only in organic solvents and produces a homogeneous, viscous honeylike or syruplike solution. If a mold body is dipped into this solution and drawn back out again, then the coating on the mold body, which is formed of the solution, can be dried by moving the mold body about in a flow or current of warm air. A glove of fully polymerized polyester urethane can then be stripped off from the mold body. The glove body of the glove not only does not require a reinforcing fabric and may be particularly thin, but also has a particularly high tear strength, high tear propagation strength, and high puncture strength. Its tensile strength and elasticity are also extraordinarily high. The synthetic rubber layer protects against the action of aggressive chemicals.

In accordance with another feature of the invention, there is provided a third layer formed of a mixture of lead oxide and polychloroprene disposed on the second layer, and a fourth layer of synthetic rubber disposed on the third layer.

In accordance with a further feature of the invention, there is provided a fifth layer of thermoplastic monocomponent polyester urethane being based on an aromatic diisocyanate, being free of reinforcing fabric and being disposed on the fourth layer, and another connecting layer between the fourth and fifth layers being formed of a mixture of the polyester urethane and the synthetic rubber.

In accordance with an added feature of the invention, the synthetic rubber is chlorosulfonated polyethylene.

In accordance with an additional feature of the invention, the synthetic rubber is unsaturated ethylene propylene rubber.

In accordance with yet another feature of the invention, the synthetic rubber is fully vulcanized.

In accordance with yet a further feature of the invention, the glove body has an open end to be connected to an opening in a housing of a glove box.

With the objects of the invention in view, there is also provided a method for manufacturing a glove, which comprises dipping a mold body terminating in a hand into a solution of thermoplastic monocomponent polyester urethane in a solvent formed of a mixture of dimethylformamide and methylethyl ketone for coating the mold body with a polyester urethane coating, removing the coated mold body from the solution, subsequently expelling the solvent from the polyester urethane coating by drying, dipping the mold body into a solution of synthetic rubber and toluene as a solvent after drying the polyester urethane coating for coating the mold body with a synthetic rubber coating, removing the coated mold body from the solution, and subsequently expelling the solvent from the synthetic rubber coating by drying.

In accordance with another mode of the invention, there is provided a method which comprises using the solvent formed of a mixture of dimethylformamide and methylethyl ketone with a toluene additive.

In accordance with a further mode of the invention, there is provided a method which comprises dipping the mold body into a suspension of lead oxide polychloroprene and toluene after drying the synthetic rubber coating for coating the mold body with a coating of a mixture of lead oxide and polychloroprene, removing the mold body with the coating from the suspension, and subsequently expelling the toluene from the coating by drying.

In accordance with an added mode of the invention, there is provided a method which comprises dipping the mold body into a solution of synthetic rubber in toluene as a solvent after drying the coating formed of the mixture of lead oxide and polychloroprene for coating the mold body with an additional coating of synthetic rubber, removing the coated body from the solution, and subsequently expelling the solvent from the synthetic rubber by drying.

In accordance with an additional mode of the invention, there is provided a method which comprises fully vulcanizing the synthetic rubber or additional synthetic rubber coating after drying.

In accordance with yet another mode of the invention, there is provided a method which comprises dipping the mold body into a solution of polyester urethane in a solvent formed of a mixture of dimethylformamide and methylethyl ketone after drying the additional coating of synthetic rubber for coating the mold body with a polyester urethane coating, removing the coated mold body from the solution, and subsequently expelling the solvent from the polyester urethane coating by drying.

In accordance with a concomitant mode of the invention, there is provided a method which comprises using the solvent formed of a mixture of dimethylformamide and methylethyl ketone with a toluene additive.

Other features which are considered as characteristic for the invention are set forth in the appended claims.

Although the invention is illustrated and described herein as constructed in a glove, in particular for a glove box containing radioactive materials and a method for its manufacture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
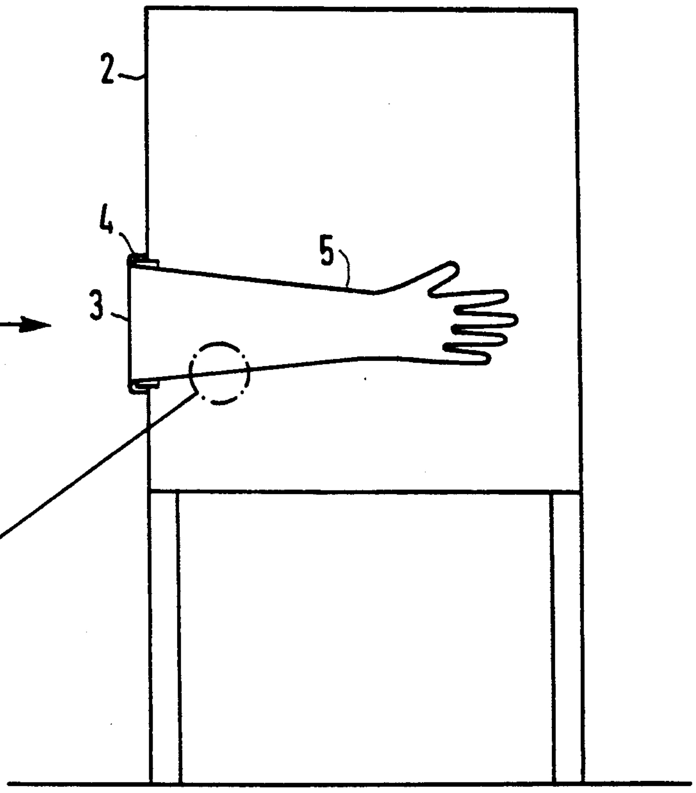
FIG. 1 is a diagrammatic, longitudinal-sectional view of a glove box.

Referring now to the figures of the drawing in detail and first, particularly, to FIG. 1 thereof, there is seen a glove box in which radioactive materials, in particular alpha emitters such as plutonium, can be processed. The glove box has a wall 2 in which a housing opening 3 is located. A ring 4 protruding outward is inserted into the housing opening 3, and a gastight work glove 5 is mounted on the ring on the outside of the housing wall 2.

Figure 2:
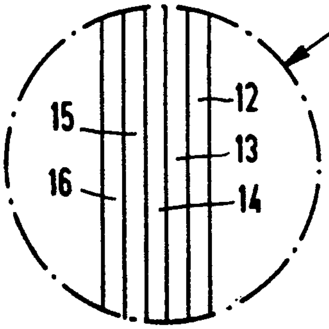
FIG. 2 is a cross-sectional view of a portion of the wall of the body of a glove according to the invention.

As FIG. 2 shows, the glove body of the work glove 5 may have four interconnected layers 12–15 disposed one over the other from one side of the glove body to the other. The layer 12 on one side of the glove body is formed of thermoplastic monocomponent polyester urethane based on an aromatic diisocyanate. The layer 13 following the layer 12 is formed of synthetic rubber. The next layer 14 is formed of a mixture of lead oxide and polychloroprene. The following layer 15 is formed of synthetic rubber. Finally, the layer 16 on the other side of the glove body is again formed of thermoplastic monocomponent polyester urethane based on an aromatic diisocyanate.

The composite system formed of the layers 12–16 additionally functions to improve the tear strength, tear propagation strength, and puncture strength as well as the elongation at tearing and the tensile strength of the work glove. The layer 14 of lead oxide and polychloroprene shields against radioactive radiation, and the synthetic rubber layers 13 and 15 protect the thermoplastic polyester urethane of the layers 12 and 16 from chemically reacting with the lead in the layer 14 and decomposing.

If, for instance, it is possible for one side of the body of the work glove 5 to come into contact with nitric acid, which attacks polyester urethane, then the body of the work glove 5 preferably would only be given a four-layer structure, which is constructed in such a way that a layer 13 or 15 of nitric-acid-resistant synthetic rubber is located on the surface of the glove body exposed to the nitric acid. This synthetic rubber may be a chlorosulfonated polyethylene. One inner layer 13 or 15 may also be of unsaturated ethylene propylene rubber.

Preferably, the synthetic rubber forming the layers 13 and 15 is fully vulcanized.

In order to manufacture a body for a work glove 5 shown in FIG. 1, with a layer sequence in accordance with FIG. 2, a 30% solution of Impranil ENB-03, an aromatic diisocyanate-based thermoplastic monocomponent polyester urethane made by Bayer in Leverkusen, Federal Republic of Germany, is prepared in a solvent that is formed of a mixture of dimethyl formamide and methylethyl ketone at a ratio of 2:1. For further dilution, the solvent mixture may also include from 20 to 30% of toluene additives.

A mold body terminating in a hand is dipped into this solution and, having been provided with a polyester urethane coating, is drawn back out of the solution. The solvent is expelled by drying, for instance by moving the mold body about in a flow of warm air at 130° C. After this drying, a polyester urethane coating is present on the mold body that is, for instance, equivalent to the layer 12 in FIG. 2.

The mold body with the dried polyester urethane coating is then dipped into a solution of synthetic rubber and toluene as the solvent. After being removed from the solution, the dried polyester urethane coating on the mold body is provided with a synthetic rubber coating, from which the solvent is expelled by drying in a flow of warm air, and which corresponds to the layer 13 in FIG. 2. An interconnecting layer of a mixture of polyurethane and synthetic rubber has simultaneously formed between the layer 13 of synthetic rubber and the polyurethane layer 12 initially forming the glove body, which assures the adhesion of the layers 12 and 13 to one another in an ideal manner.

After the drying of the synthetic rubber coating, the mold body is dipped into a suspension of lead oxide, polychloroprene and toluene and, after being provided with a coating formed of a mixture of lead oxide and polychloroprene, is removed from the suspension. The toluene is then expelled from the coating by drying in a flow of warm air. The coating formed of the mixture of lead oxide and polychloroprene is equivalent to the layer 14 in FIG. 2.

The mold body is then dipped again into the solution of chlorosulfonated polyethylene and toluene as the solvent, and is then provided with an additional coating of chlorosulfonated polyethylene and removed from the solution. Once again, the solvent is expelled from this chlorosulfonated polyethylene by drying. This dried additional coating of chlorosulfonated polyethylene is equivalent to the layer 15 in FIG. 2.

Next, the mold body, with the coatings located thereon, is introduced into a vulcanizing furnace, in which the coatings formed of synthetic rubber are fully vulcanized in air at an elevated temperature and elevated pressure.

After the complete vulcanization, the mold body is finally re-dipped into the solution of the thermoplastic monocomponent polyester urethane based on an aromatic diisocyanate in the solvent formed of the mixture of dimethylformamide and methylethyl ketone with the toluene additive, and having thus been provided with a polyester urethane coating, is removed from the solution. After drying by expulsion of the solvent from this polyester urethane coating in a warm air flow, this polyester urethane coating corresponds to layer 16 of FIG. 2.

Subsequently, the completed glove can be stripped off of the mold body and attached to the glove box of FIG. 1, for instance.

The wall thickness of the glove body may be between 0.4 and 0.9 mm. The layers 12–16 may each have a thickness of from 0.05 to 0.4 mm. The layers 12–16 adhere well to one another.

If it is unnecessary for the glove body to shield against radioactive radiation, then a glove body having only the layers 12 and 13 in FIG. 2 is sufficient. Since the connecting layer formed of polyester urethane and synthetic rubber is located between these layers 12 and 13, a glove body of this type can not only be made extremely thin, but this glove body is also extraordinarily gastight. The glove body also has high tear, tensile and puncture strength.

What is claimed is:

1. Method for manufacturing a glove, which comprises dipping a mold body terminating in a hand into a solution of thermoplastic monocomponent polyester urethane in a solvent formed of a mixture of dimethylformamide and methylethyl ketone for coating the mold body with a polyester urethane coating, removing the coated mold body from the solution, subsequently expelling the solvent from the polyester urethane coating by drying, dipping the mold body into a solution of synthetic rubber and toluene as a solvent after drying the polyester urethane coating for coating the mold body with a synthetic rubber coating, removing the coated mold body from the solution, and subsequently expelling the solvent from the synthetic rubber coating by drying whereby a connecting layer formed of a mixture of the polyester urethane and the synthetic rubber is formed between the polyester urethane coating and the synthetic rubber coating.

2. Method according to claim 1, which comprises using the solvent formed of a mixture of dimethylformamide and methylethyl ketone with a toluene additive.

3. Method according to claim 1, which comprises dipping the mold body into a suspension of lead oxide polychloroprene and toluene after drying the synthetic rubber coating for coating the mold body with a coating of a mixture of lead oxide and polychloroprene, removing the mold body with the coating from the suspension, and subsequently expelling the toluene from the coating by drying.

4. Method according to claim 3, which comprises dipping the mold body into a solution of synthetic rubber in toluene as a solvent after drying the coating formed of the mixture of lead oxide and polychloroprene for coating the mold body with an additional coating of synthetic rubber, removing the coated body from the solution, and subsequently expelling the solvent from the synthetic rubber by drying.

5. Method according to claim 1, which comprises fully vulcanizing the synthetic rubber coating after drying.

6. Method according to claim 4, which comprises fully vulcanizing the additional synthetic rubber coating after drying.

7. Method according to claim 4, which comprises dipping the mold body into a solution of polyester urethane in a solvent formed of a mixture of dimethylformamide and methylethyl ketone after drying the additional coating of synthetic rubber for coating the mold body with a polyester urethane coating, removing the coated mold body from the solution, and subsequently expelling the solvent from the polyester urethane coating by drying.

8. Method according to claim 7, which comprises using the solvent formed of a mixture of dimethylformamide and methylethyl ketone with a toluene additive.

9. Method according to claim 1, which comprises using a solution of thermoplastic monocomponent polyester urethane based on an aromatic diisocyanate in the dipping step.

* * * * *